No. 763,320. Patented June 21, 1904.

UNITED STATES PATENT OFFICE.

ALCIDE FRANCOIS POIRRIER, OF PARIS, FRANCE, ASSIGNOR TO STÉ. AME. DES MATIÈRES COLORANTES ET PRODUITS CHIMIQUES DE ST. DENIS, OF PARIS, FRANCE.

PROCESS OF MAKING SULFUR DYES.

SPECIFICATION forming part of Letters Patent No. 763,320, dated June 21, 1904.

Application filed July 7, 1903. Serial No. 164,593. (Specimens.)

*To all whom it may concern:*

Be it known that I, ALCIDE FRANCOIS POIRRIER, of Paris, France, have invented certain new and useful Improvements in the Manufacture of Coloring-Matters, which improvements are fully described in the following specification.

I have already prepared blue and blue-violet coloring-matters by the action, under particular conditions of temperature, of the product obtained by the combination of sulfur chlorid on phenol or the cresols or commercial cresol on certain diphenylamins or indophenols. I have extended this reaction to other combinations of phenols or of diphenylamins under similar conditions of procedure; but instead of using an indophenol obtained by oxidizing paraphenylene diamin and a phenol, as heretofore, I use an indophenol obtained from an alkylated paraphenylenediamin, and preferably dimethylated paraphenylenediamin. As an illustration of my invention, I give the following example:

Example: In a cast-iron apparatus heated and provided with a stirrer one and a half parts of the product of oxidation of an equimolecular mixture of dimethylated paraphenylenediamin and phenol (Nietzky, *Chemie der Organischen Farbstoffe*, page 131) are reduced by an alkali sulfid—as, for example, by two or four parts of crystallized sodium sulfid dissolved in fifteen to twenty parts of hot water. The mixture is slowly heated to 120° to 130° centigrade, and when it is pasty there are added one to one and one-half parts of the product of the reaction of sulfur chlorid on commercial cresol. The mass, which is at first liquid, becomes by degrees pasty and then solid and is thereupon heated again for several hours at a temperature of 130° to 140° centigrade. It may even attain a temperature of 150° or 160° centigrade. There is thus obtained a solid mass, soluble in water to a dark-blue solution and capable of dyeing cotton which is not mordanted fast-blue tints.

When in the preceding example the sodium sulfid has been limited to two parts, it is useful to add sodium sulfid to the crude product to facilitate its dissolution.

For the indophenol of dimethylparaphenylenediamin above mentioned may be substituted the same indophenol from ortho or meta cresol, and for the product of the reaction of sulfur chlorid on the cresols may be substituted the product of the reaction of sulfur chlorid on phenol.

The following table indicates the general character of the different coloring-matters obtained by the method described and under the conditions set forth in the example.

[See example, page 2.]

I claim—

1. The process of producing coloring-matter, consisting in oxidizing a mixture of alkylated paraphenylenediamin and a phenol, reacting the indophenol thus obtained with an alkali sulfid and then with the product resulting from the reaction of chlorid of sulfur on a phenol.

2. The process of producing coloring-matter consisting in oxidizing a mixture of methylated paraphenylenediamin and a phenol, reacting the indophenol thus obtained with an alkali sulfid and then with the product resulting from the reaction of chlorid of sulfur on a phenol.

3. The process of producing coloring-matter consisting in oxidizing a mixture of dimethylparaphenylenediamin and a phenol, reacting the indophenol thus obtained with an alkali sulfid and then with the product resulting from the action of chlorid of sulfur on a phenol.

4. The process of producing coloring-matter consisting in oxidizing a mixture of dimethylparaphenylenediamin and a cresol, reacting the indophenol thus obtained with an alkali sulfid and then with the product resulting from the reaction of chlorid of sulfur on a phenol.

In witness whereof I have hereunto signed my name in the presence of two subscribing witnesses.

ALCIDE FRANCOIS POIRRIER.

Witnesses:
MARCEL ARMENGAUD, Jeune,
J. ALLISON BOWEN.

| Indophenol obtained by oxidizing dimethylparaphenylene and— | Reacting on the product of the action of sulfur chlorid on— | Color of solution in water. | The aqueous solution on addition of sodium carbonate becomes— | Color of the precipitate obtained by adding acid. | Color of the solution obtained by dissolving the precipitate produced by acid in— | | | | Tint produced on cotton which is not mordanted. | Steaming changes the tint to— |
|---|---|---|---|---|---|---|---|---|---|---|
| | | | | | Strong sulfuric acid. | Nitrous sulfuric acid. | Sodium-sulfid solution. | Caustic-soda solution. | Color produced by treating the preceding solutions with hydrochloric acid. | | |
| Phenol | Commercial cresol. | Blue-violet. | Bright blue. | Yellow becoming green in air. | Dark indigo-blue. | Dark blue. | Violet-blue. | Pure blue. | Bright indigo-blue. | Blue. | Indigo-blue. |
| | Phenol | Yellowish brown oxidizing rapidly in air to blue. | Bright blue. | Yellow becoming green in air. | Dark indigo-blue. | Dark blue. | Violet. | Dark blue. | Greenish blue. | Blue. | Bright blue. |
| Orthocresol | Commercial cresol. | Reddish brown. | Violet. | Greenish brown. | Dark greenish blue. | Greenish blue. | Dirty violet. | Dark blue. | Blue. | Violet-gray. | Dark violet. |
| | Phenol | Yellowish brown. | Violet. | Greenish brown. | Dark greenish blue. | Greenish blue. | Violet-brown. | Dark violet-blue. | Greenish blue. | Greenish blue. | Blue. |
| Metacresol | Commercial cresol. | Violet-brown. | Violet-blue. | Grayish brown. | Bluish black. | Bluish black. | Dark blue. | Dirty violet. | Dark blue. | Violet-gray. | Dark violet. |
| | Phenol | Yellowish brown. | Dark violet-blue. | Gray. | Bluish black. | Violet-black. | Violet-brown. | Greenish yellow. | Bluish green. | Blue-gray. | Blue. |